Jan. 21, 1941. H. A. MANTZ Re. 21,698

MULTIPILOT CONTROLLED VALVE

Original Filed Sept. 10, 1934

Inventor:
Harold A. Mantz
By: Brown, Jackson, Boettcher & Dienner
attys. 18.

Reissued Jan. 21, 1941 Re. 21,698

UNITED STATES PATENT OFFICE 21,698

MULTIPILOT CONTROLLED VALVE

Harold A. Mantz, Milwaukee, Wis., assignor to Milwaukee Gas Specialty Company, Milwaukee, Wis., a corporation of Wisconsin Original No. 2,045,664, dated June 30, 1936, Serial No. 743,381, September 10, 1934. Application for reissue August 9, 1937, Serial No. 158,173

7 Claims. (Cl. 158—117.1)

Figure 1:
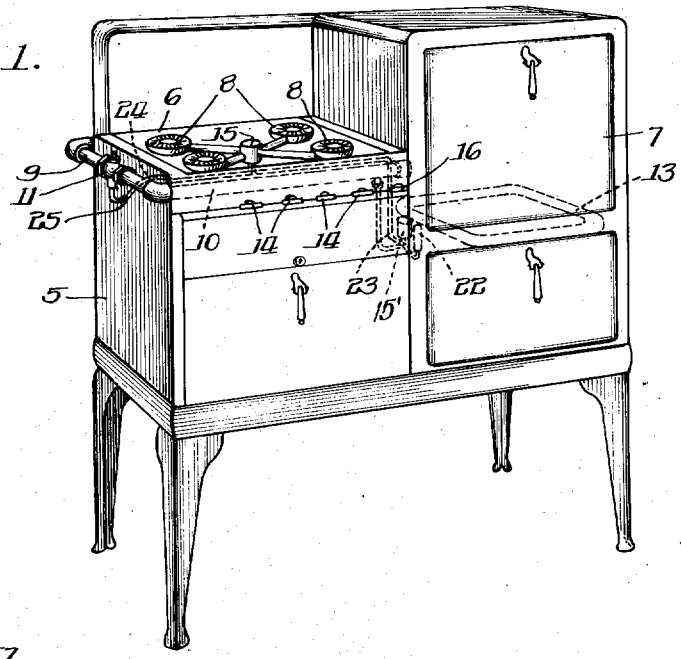

This invention relates to safety valves, and more particularly to a multi-pilot controlled safety valve which is maintained in open position only when each of a plurality of pilot burners is ignited, and which is snapped to closed position upon extinguishment of any one of the pilot burners.

In the provision of automatically operable safety valves for domestic gas ranges and the like, in which there may be two or more separate and independent pilot burners, such as, for example, the pilot burner for the open top or cooking burners, and the pilot burner for the oven burner, it is desirable to have the safety valve close off the fuel supply to all the burners upon extinguishment of either or both of the pilot burners. The same condition exists in the use of any heating installation in which more than one pilot burner is employed.

The preferred embodiment of my invention provides a safety valve structure of this type, which is controlled by the expansion and contraction of a Syiphon-type bellows, the movement of the bellows being produced by the heating and cooling of fluid pressure chambers connected in series and positioned adjacent the respective pilot burners. The movement of the safety valve is controlled by a spring member of disc-like form, which is manually operable to provide for resetting of the valve independently of the restraining pressure responsive means, if such action is desirable.

The bellows structure and the pressure-restraining spring disc are so calibrated that all of the pilot burners must be ignited to develop sufficient pressure to open the valve against the restraining spring member, and the extinguishment of any of the pilot burners will produce a sufficient cooling in the associated pressure chamber to allow a decrease of pressure sufficient so that the valve will close under the spring pressure.

The primary object of the present invention is the provision of a safety valve of this type under the control of a plurality of pilot burners or igniters which are separately positioned with respect to the appliance, whereby the valve will be automatically closed upon extinguishment of any one of the pilot burners.

Another object of the present invention is the provision of a neat, compact and positively operating control system for a safety valve of this type.

A distinctly desirable advantage secured by the present invention is the provision of adjusting means for varying the effective pressure of the spring disc member upon the valve member, and adjusting means for varying the position of the bellows or pressure responsive means with respect to the valve seat and spring.

Other objects and advantages of the present invention will appear more fully from the following detailed description, which, taken in conjunction with the accompanying drawing, will disclose to those skilled in the art the particular construction and operation of a preferred form of the invention.

Figure 2:
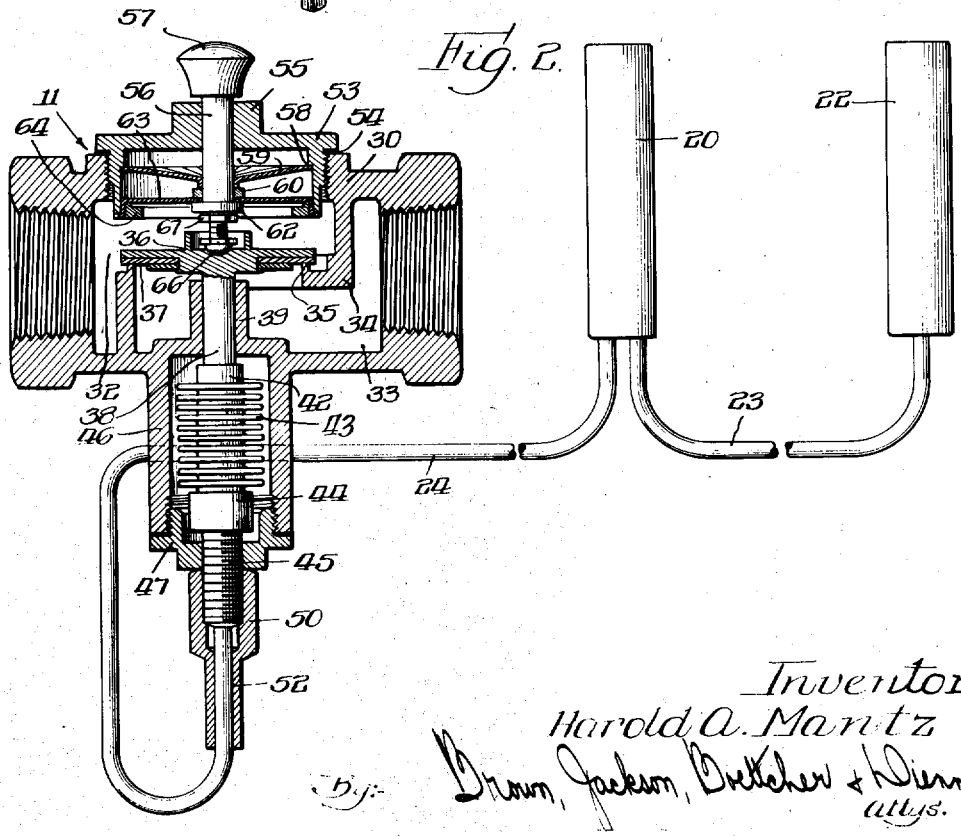

In the drawing:

Figure 1 is a perspective view of a common type of domestic gas range provided with the safety control means of the present invention; and Figure 2 is a vertical sectional view of the safety valve member, with the individual pressure responsive means for each of the pilot burners diagrammatically shown in connected position.

Referring now in detail to the drawing, in Figure 1 the domestic gas range is indicated in its entirety by the reference numeral 5, and comprises the burner or cooking compartment 6 and the oven compartment 7. The cooking compartment 6 includes a plurality of open top or cooking burners 8, which are supplied with fuel from a fuel supply conduit 9 leading to the gas manifold 10 extending across the front of the range.

Disposed between the fuel supply conduit 9 and the manifold 10 is the safety valve indicated generally at 11.

An oven burner, shown diagrammatically in Figure 1 at 13, is also connected to receive its fuel supply from the gas manifold 10.

Suitable control valves, indicated at 14, are provided for the purpose of controlling the operation of the burners 8.

The burners 8 are disposed in spaced relation to a central pilot burner indicated generally at 15, and which is provided with radiating tubes leading to the burners for igniting the same upon admission of gas to the burners. In addition, a pilot burner 15′ is also connected to receive fuel from the manifold 10 and to support a pilot flame adjacent the oven burner 13. These pilot burners may be of any well known form. The valve member 16 is provided for the purpose of controlling the flow of fuel to the oven burner 13.

Adjacent the pilot burner 15 and the oven pilot burner 15′ is a fluid pressure cylinder, the pressure cylinder for the pilot burner 15 being indicated at 20 and the pressure chamber for the pilot burner 15′ for the oven being indicated at 22.

The pressure chamber 22 is connected, through the flexible metallic tubing 23, to the pressure chamber 20, and the pressure chamber 20 is connected through the flexible metallic tubing 24 to the control valve 11, passing outwardly through the burner compartment wall through opening 25.

Referring now in detail to Figure 2, in which is shown a detailed embodiment of a safety valve, the valve body is indicated generally at 30 and is provided with the inlet chamber 32 and the outlet chamber 33 separated by the partition wall 34. The partition wall 34 is provided with an annularly extending recess forming a shoulder 35 providing an annular valve seat through which fuel is adapted to flow from the chamber 32 to the chamber 33.

A suitable valve member 36, provided with a valve seating portion 37 formed of leather, fiber or other suitable material, is mounted upon an integral valve stem 38 which is supported for reciprocatory movement in a boss 39 formed integral with the valve body 30. The member 36 is adapted to have valve seating engagement with the valve seat 35, to control the flow of fuel from the chamber 32 to the chamber 33.

The lower end of the valve stem 38 is secured to the upper end 42 of a Sylphon bellows member indicated generally at 43, and which is provided at its lower end, indicated at 44, with an adjustable screw member 45, which is hollow, and is adapted to receive the extending end of the flexible tubing 24, the tubing being sealed therein or otherwise secured thereto.

The bellows 43, which, although I have shown it in the form of a Sylphon bellows, may be any type of pressure actuated member capable of effecting reciprocatory movement of the valve stem 38, is enclosed within a cylindrical offset portion 46 of the valve body 30, and is enclosed within the recess 46 by the cap member 47, which has threaded engagement therewith, and which, in addition, is provided with a threaded interior portion receiving the threaded adjusting screw 45. By this means, upon rotation of the adjusting screw 45, the bellows 43 is shifted axially with respect to the chamber 46 to provide for adjustment of the valve member 36 with respect to the valve seat 35. A locking nut, indicated at 50, is provided for locking the screw 45 in adjusted position, and is provided with an extending cylindrical portion 52 serving as a support for the end of the flexible tubing 24, to guide it into engagement with the member 45, and to prevent angular movement of the tubing with respect to the adjusting screw 45 tending to break the fluid pressure connection therebetween.

The valve body 30 is also provided with a valve cap 53, having threaded engagement therewith, there being a gasket 54 interposed therebetween to prevent gas leakage. The cap 53 is provided with an upwardly extending boss portion 55 adapted to form a bearing for the reset control stem 56, which extends through the valve cap 53 and is provided with an operating cap or button 57 adapted to be manually gripped for manual resetting of the valve.

The valve cap 53 is provided with an annular shoulder 58 against which the outer peripheral edge of a spring disc member 59 is adapted to abut. The spring disc member 59 is concaved, and optionally radially corrugated, and is flexed in an upward direction, in the position shown in Figure 2, by means of the abutting engagement with the collar 60 carried by the stem 56. The stem 56, at its lower end, is provided with the integrally formed annular flange 62, and a suitable packing disc 63 is gripped between the collar 60 and the flange 62, thereby being movable with reciprocation of the stem 56. The disc 63 is secured, at its outer edge, about the outwardly extending cylindrically flanged portion of the valve cap 53 by means of the packing disc ring 64, which is press-fitted into engagement to secure the packing disc 63 in position. This effectively seals the recessed portion of the chamber 53 against entrance of gas from the inlet chamber 32 of the valve.

Threaded into the lower end of the stem 56 is an adjusting screw 66, which is provided with a lock nut 67 for securing the screw 66 in adjusted position with respect to the stem 56. The screw 66 is adjusted to have seating engagement in the upper surface of the valve member 36, there being a suitably recessed depression formed therein providing for seating of the head end of the screw 66 therein.

In the operation of the valve disclosed, the valve member is normally maintained in closed position by the spring pressure of the spring disc 59 bearing against collar 60, and thus bearing against the flange 62 urging the reset stem 56 downwardly, to hold the valve member 36 in valve closing position. Any suitable gas, such as air, or other gas having a relatively high coefficient of expansion, is confined within the bellows 43, the tubing 24, the tubing 23 and the fluid pressure chambers 20 and 22. This confined gas system is sealed against leakage or the entrance of outside air, and comprises a sealed fluid pressure system. When the pilot burners, such as the burners 15 and 15', are ignited, the fluid in the chambers 20 and 22 expands due to the heating of these chambers by the pilot flame. This results in an increase of pressure in the tubing 24, which results in an increase in pressure in the flexible bellows 43. This increase of pressure tends to elongate the bellows, producing an upward stress upon the valve stem 38. This stress is counteracted by the resiliency of the spring disc 59, but when the pressure reaches a predetermined point, determined by the setting of the pilot burners, the spring disc is moved upwardly, and the valve member is thus opened under this pressure. The effective pressure developed by the heating of chambers 20 and 22, is so calibrated that the valve member will be raised from its seat against the spring pressure disc 59 only when all of the pilot burners are ignited and the chambers 20 and 22 are being heated. Thus, if either of the pilot burners is extinguished, the corresponding chamber is cooled and results in a decrease in pressure, so that the pressure and, consequently, the elongation of the bellows 43 is decreased, allowing the spring disc 59 to force the valve member downwardly into closed position. By adjustment of the screw 66, the effective pressure of the spring disc 59 upon the valve member 36 may be varied, and by adjustment of the screw 45 variations in the effective pressure necessary to raise the valve member from its seat may be controlled.

If it is desired to operate the valve without restraint, such as for resetting the valve in open position to reignite the pilot burners, the reset stem 56 is pulled upwardly, snapping the spring disc 59 upwardly, and thus releasing engagement between the adjusting screw 66 and the valve member 36, allowing free movement of the valve member directly under the influence of the pressure in chambers 20 and 22. Thus, upon slight heating of either of these chambers, the valve will open, providing for flow of fuel to reignite the pilot burners.

It is to be understood that the fluid pressure chamber, such as chambers 20 and 22, may be multiplied, where there are more than two pilot burners in the installation, and in such case the calibration is changed so that it is necessary for all of the pilot burners to be ignited in order to provide sufficient pressure to open and maintain the valve member in opened position.

If desired, the pressure chambers 20 and 22 may be provided with heat radiating fins or similar heat dissipating means, in order to provide for more rapid cooling of the same, if more rapid operation of the valve member is required. They may also be connected either for series or parallel operation.

Inasmuch as the system is capable of adjustment to accommodate more or less pilot burners and associated pressure chambers, I do not intend to be limited to the construction which I have shown and described, but only insofar as defined by the scope and spirit of the appended claims.

I claim:

1. In a domestic gas range, a cooking compartment, an oven compartment, pilot burners in each of said compartments, a main fuel supply conduit terminating in a manifold extending into said cooking compartment, a valve in said conduit anterior to said manifold, means normally biasing said valve to closed position, expansible pressure responsive means carried by said valve for opening the same against said biasing means upon increase in pressure therein, and serially connected thermally sensitive means adjacent each of said pilot burners providing for increase of pressure in said pressure responsive means to open said valve only during ignition of both of said pilot burners, and means operative to render said biasing means inoperative whereby said valve is responsive solely to variations in pressure within said pressure responsive means.

2. In combination, a fuel supply conduit, a valve in said conduit including a valve body, a valve member reciprocal therein for opening and closing said valve, a spring disc normally biasing said valve member toward closed position, pressure responsive means carried by said valve body adapted to move said member toward open position, a pair of remotely disposed separate flame supporting means, means associated with each of said flame means and responsive to the heat thereof for actuating said pressure responsive means, the heat of one of said flame means alone being insufficient to produce actuation of said valve member to open position against the pressure of said spring disc, and means operative to render the bias of said disc inoperative with respect to said valve member whereby the heat of one of said flame means is sufficient to produce opening of said valve member by said pressure responsive means.

3. In combination, a valve housing having a valve seat therein, a valve member on said seat, pressure-responsive means operative to open said valve member, a reset stem in said housing, means carried by said stem engaging said valve member, spring means normally biasing said engaging means into position to maintain said valve member on said seat, said reset stem being operative to render said biasing means inoperative, and a plurality of pressure-developing means remote from said housing and having common communication with said pressure-responsive means whereby all of said last-named means together are capable of raising said valve member from said seat against said biasing means, any one of said pressure-developing means being capable of developing sufficient pressure to raise said valve member from said seat when said biasing means has been rendered inoperative.

4. In combination, a valve comprising a valve housing, a valve member therein having reciprocatory movement for opening and closing said valve, means normally biasing said valve member to closed position, means operative to render said biasing means inoperative, pressure-actuated means operative to open said valve member, a plurality of thermally responsive pressure means serially connected together and communicating with said pressure-actuated means, all of said pressure means when operating together being capable of opening said valve member against said biasing means, and any one of said pressure means alone being capable of opening said valve member when said biasing means is rendered inoperative.

5. In a domestic gas range, a cooking compartment, an oven compartment, pilot burners in each of said compartments, a main fuel supply conduit terminating in a manifold extending into said cooking compartment, a valve in said conduit anterior to said manifold, means normally biasing said valve to closed position, expansible pressure responsive means associated with said valve, connected thermally sensitive means adjacent each of said pilot burners and providing for increase in pressure in said pressure responsive means to hold said valve open against said biasing means only when both of said pilot burners are ignited, and means operative to render said biasing means inoperative so that said valve is responsive to variations in pressure within said pressure responsive means independently of the biasing action of said biasing means.

6. In combination, a valve housing having a valve seat therein, a valve member cooperable with said seat, pressure responsive means operative to hold said valve member in open position, a reset stem in said housing, means carried by said reset stem and engaging said valve member, spring means normally biasing said engaging means into position to maintain said valve member on said seat, said reset stem being operative to render said biasing means inoperative, and a plurality of pressure developing means remote from said housing and having common communication with said pressure responsive means and arranged so that all of said last named means together are capable of holding said valve member away from said seat against said biasing means, any one of said pressure developing means being capable of developing sufficient pressure to move said valve member from said seat when said biasing means has been rendered inoperative.

7. In combination, a valve comprising a valve housing, a valve member therein having reciprocatory movement for opening and closing said valve, means normally biasing said valve member to closed position, means operative to render said biasing means inoperative, pressure actuated means operative to hold said valve member in open position, a plurality of thermally responsive means communicating with said pressure actuated means, all of said thermally responsive pressure means when operating together being capable of holding said valve member open against said biasing means and any one of said thermally responsive pressure means alone being capable of opening said valve member when said biasing means is rendered inoperative.

HAROLD A. MANTZ.